United States Patent [19]

Onozuka et al.

[11] Patent Number: 5,023,305

[45] Date of Patent: Jun. 11, 1991

[54] OXYGEN-PERMEABLE HARD CONTACT LENS MATERIAL WITH EXCELLENT IMPACT RESISTANCE

[75] Inventors: Shigeharu Onozuka; Yuuichi Yokoyama; Makoto Tsuchiya, all of Tokyo, Japan

[73] Assignee: Hoya Corporation, Tokyo, Japan

[21] Appl. No.: 492,388

[22] Filed: Mar. 7, 1990

Related U.S. Application Data

[63] Continuation of Ser. No. 206,858, filed as PCT JP87/00361 on Jun. 9, 1987, published as WO88/02498 on Apr. 7, 1988, abandoned.

[30] Foreign Application Priority Data

Sep. 30, 1986 [JP] Japan .................................. 61-232789

[51] Int. Cl.$^5$ ...................... C08F 230/08; C08F 30/08
[52] U.S. Cl. .................................... 526/194; 526/245; 526/279
[58] Field of Search ........................ 526/194, 245, 279

[56] References Cited

U.S. PATENT DOCUMENTS 4,605,712  8/1986  Mueller et al. ................. 526/279 X

FOREIGN PATENT DOCUMENTS

| 1205247 | 5/1986 | Canada .............................. 526/279 |
| A10030807 | 6/1981 | European Pat. Off. . |
| A20242080 | 3/1987 | European Pat. Off. . |
| 59-77411 | 5/1985 | Japan . |
| 61-281216 | 12/1986 | Japan . |
| WO84/00968 | 3/1984 | PCT Int'l Appl. . |

*Primary Examiner*—Joseph L. Schofer
*Assistant Examiner*—Jeffrey T. Smith
*Attorney, Agent, or Firm*—Darby & Darby

[57] ABSTRACT

A copolymer composed mainly of at least one monomer component selected from fluorine-containing (meth)acrylates and silicone-containing (meth)acrylates and a siloxane oligomer having a polymerizable functional group at the molecular terminals is useful as an oxygen-permeable hard contact lens material with excellent impact resistance.

7 Claims, No Drawings

OXYGEN-PERMEABLE HARD CONTACT LENS MATERIAL WITH EXCELLENT IMPACT RESISTANCE

This is a continuation of application Ser. No. 206,855, filed as PCT JP87/00361 on Jun. 9, 1987, published as WO88/02498 on Apr. 7, 1988, now abandoned.

TECHNICAL FIELD

The present invention relates to an oxygen-permeable hard contact lens material with excellent impact resistance and more particularly to an oxygen-permeable hard contact lens material with excellent impact resistance characterized by using a siloxane oligomer having a polymerizable functional group at the molecule terminals.

BACKGROUND ART

In recent years, hard contact lenses use a material of higher oxygen permeability than conventional PMMA (polymethyl methacrylate) materials and these hard contact lenses have wide acceptance in the market as an oxygen-permeable hard contact lens. Because of their excellent oxygen permeability, these oxygen-permeable hard contact lenses permit oxygen supply from the atmosphere to the cornea, have a low risk of causing cacochymia of the cornea, and accordingly have relatively high safety. Further, unlike soft contact lenses made of a material containing a large amount of water, the oxygen-permeable hard contact lenses have good stabilities in dimension, shape, etc., are unlikely to be contaminated with bacteria, etc., allow easy handling, and accordingly can be said to be a lens of high safety. As the materials for the oxygen-permeable hard contact lenses, there have conventionally been proposed various materials, for example, cellulose derivatives [e.g. CAB (cellulose acetate butyrate)], copolymers of a silicone-containing (meth)acrylate and an alkyl (meth)acrylate, styrene derivatives, and copolymers of a fluorine-containing (meth)acrylate and an alkyl (meth)acrylate. In recent years, copolymers composed mainly of a silcone-containing (meth)acrylate or a fluorine-containing (meth)acrylate have been proposed and, because of their very high oxygen permeability, are gaining increasing acceptance in the market. However, a contact lens material with high oxygen permeability made by using an increased amount of such a silicone-containing or fluorine-containing (meth)acrylate as a component for increasing oxygen permeability becomes to have reduced mechanical properties and are insufficient particularly in processability and impact resistance. Meanwhile, a contact lens material with improved procesability, mechanical strength and impact resistance, made by appropriately selecting an alkyl (meth)acrylate becomes to have low oxygen permeability.

Thus, at present there has not yet been developed any contact lens material having high oxygen permeability and a good balance in various properties such as mechanical properties, processability, dimensional stability, wettability by water and optical properties. As the oxygen permeability of contact lens is enhanced, the brittleness of the lens increases and the lens tends to be broken even by a small impact. This is a serial problem in practical application of contact lens.

DISCLOSURE OF THE INVENTION

In view of the above-mentioned problems of the conventional oxygen-permeable hard contact lens materials, the present inventors have made extensive research and, as a result, have completed the present invention.

Therefore, an object of the present invention is to provide an oxygen-permeable hard contact lens material with excellent impact resistance and more particularly to an oxygen-permeable hard contact lens material with excellent impact resistance characterized by using a siloxane oligomer having a polymerizable functional group at the molecule terminals. Another object of the present invention is to provide a hard contact lens material which has high oxygen permeability, is difficult to break and can be used over a long period of time. Other objects and advantages of the present invention will become apparent from the following description.

The oxygen-permeable hard contact lens material with excellent impact resistance according to the present invention comprises a copolymer composed mainly of at least one monomer component selected from fluorine-containing (meth)acrylates and silicone-containing (meth)acrylates and a siloxane oligomer having a polymerizable functional group at the molecule terminals.

BEST MODE FOR CARRYING OUT THE INVENTION

The siloxane oligomer having a polymerizable functional group at the molecule terminals, used in the present invention can provide the copolymer of the present invention with remarkably improved impact resistance. Preferable as the siloxane oligomer are those represented by the following formulas (I) to (III).

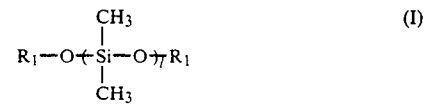

[$l$ is an integer of 10–200, and $R_1$ is

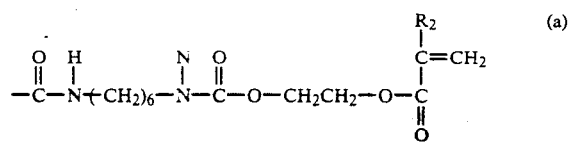

or

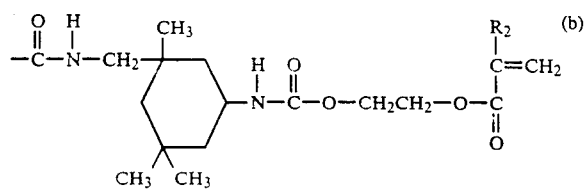

($R_2$ is H or a methyl group)].

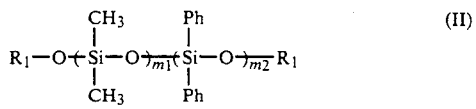

[$(m_1 + m_2)$ is an integer of 12–140, and $m_1 \geq 0$ and $m_2 \geq 1$; Ph is a phenyl group; and $R_1$ is same as $R_1$ of the formula (I)].

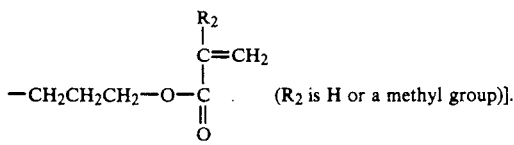

[n is an integer of 10-500, and R₃ is

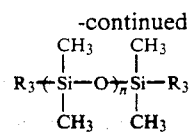

($R_2$ is H or a methyl group)].

The molecular weights of these siloxane oligomers are preferably 1,000 to 6,000. The IPDI (isophorone diisocyanate) type oligomers of the formula (I) or (II) [$R_1$ is (b)] are most preferable because they can provide the copolymer with a striking improvement in impact resistance.

The preferable range of the amount used of the siloxane oligomer may vary depending upon, for example, the type and amount of the monomer component used for the improvement of oxygen permeability but is usually 0.1-15% by weight in the copolymer. When the content of the siloxane oligomer in the copolymer exceeds 15% by weight, the resulting copolymer easily causes plastic deformation. When the content is less than 0.1% by weight, it is difficult to obtain an effect of improvement of impact resistance. The content of the siloxane oligomer is particularly preferably 1-7% by weight in view of its compatibility with other components, the handleability and the effect of improvement of impact resistance.

The main monomer component of the oxygen-permeable hard contact lens material of the present invention is at least one monomer selected from fluorine-containing (meth)acrylates and silicone-containing (meth)acrylates.

As the fluorine-containing (meth)acrylates, there can be preferably used, for example, fluorine-containing $C_2$-$C_{12}$ alkyl esters of (meth)acrylic acid such as 2,2,2-trifluoroethyl (meth)acrylate, 2,2,2',2',2'-hexafluoroisopropyl (meth)acrylate, 2,2,3,3,4,4,4-heptafluorobutyl (meth)acrylate, 2,2,3,3,4,4,5,5,6,6,7,7,8,8,8-pentadecafluorooctyl (meth)acrylate, 2,2,3,3,4,4,5,5,6,6,7,7,8,8,9,9-hexadecafluorononyl (meth)acrylate and the like.

Preferable examples of the silicone-containing (meth)acrylates are siloxanylalkyl (meth)acrylates such as pentamethyldisiloxanylmethyl (meth)acrylate, tris(trimethylsiloxy)silylpropyl (meth)acrylate, 3-methacryloxypropyl-tris(vinylmethylsiloxy)silane, trimethylsilyl (meth)acrylate, phenyldimethylsilylmethyl (meth)acrylate, bis(methacryloxypropyl)tetramethyldisiloxane, 1,3-bis(methacryloxypropyl)-tetrakis(trimethylsiloxy)-disiloxane and the like.

The fluorine-containing (meth)acrylate and/or the silicone-containing (meth)acrylate can provide the copolymer with high oxygen permeability and is an essential component in the present invention. The combined use of these two compounds is preferable, and the oxygen permeability of the copolymer can be controlled by changing the amount ratio of the two compounds.

The amount used of at least one monomer component selected from fluorine-containing (meth)acrylates and silicone-containing (meth)acrylates is preferably 25-90% by weight in the copolymer, in usual cases.

In the present invention, it is preferred that a hydrophilic monomer and/or a crosslinkable monomer be used together with the fluorine-containing (meth)acrylate and/or the silicone-containing (meth)acrylate.

As the hydrophilic monomer, there can be mentioned hydroxyl group-containing (meth)acrylates such as 2-hydroxyethyl (meth)acrylate, 2-hydroxypropyl (meth)acrylate, 2-hydroxybutyl (meth)acrylate and the like; unsaturated carboxylic acids such as acrylic acid, methacrylic acid, itaconic acid, fumaric acid, maleic acid, cinnamic acid and the like; (meth)acrylamides such as acrylamide, methacrylamide, dimethylacrylamide, diethylacrylamide and the like; vinylpyridine; vinylpyrrolidone; and so forth. The hydrophilic monomer as a comonomer can provide the copolymer with wettability by water, whereby the resulting contact lens can have increased affinity with lacrima and provide lens users with better feeling of lens wearing. Of the above compounds, the unsaturated carboxylic acids are particularly preferable because they provide the copolymer with remarkably improved hardness and wettability by water.

The amount used of the hydrophilic monomer is usually 2-30% by weight, preferably 5-15% by weight in the copolymer.

As the crosslinkable monomer, there can be mentioned alkylene glycol di(meth)acrylates such as ethylene glycol di(meth)acrylate, diethylene glycol di(meth)acrylate and the like, as well as monomers of at least bifunctionality such as trimethylolpropane tri(meth)acrylate, pentaerythritol tetra- or tri(meth)acrylate and the like. The crosslinkable monomer can provide the copolymer with improved hardness.

The amount used of the crosslinkable monomer is usually 0.1-15% by weight, preferably 2-5% by weight in the copolymer.

In producing an oxygen-permeable hard contact lens material with excellent impact resistance of the present invention, preferably 0.1-15% by weight of a siloxane oligomer having a polymerizable functional group at the molecule terminals is mixed with preferably 85-99.9% by weight of a fluorine-containing (meth)acrylate and/or a silicone-containing meth)acrylate, preferably their mixture with a hydrophilic monomer and a crosslinkable monomer; thereto is added a polymerization initiator such as azobisisotyronitrile, azobisdimethylvaleronitrile, benzoyl peroxide, lauroyl peroxide or the like in an amount of preferably 0.05-1% by weight, and they are mixed; the resulting mixture is poured into a casting container made of a metal, plastic or glass; the container is tightly sealed and placed in a water bath or an electric oven to thermally polymerize the contents in the container; thereby an oxygen-permeable hard contact lens material with excellent impact resistance can be obtained in a rod or button shape. If necessary, an ultraviolet absorber and/or a coloring agent usually used may be added. The polymerization may also be conducted by ultraviolet polymerization, etc. It is also possible to conduct the polymerization in a mold capable of forming a lens shape.

The thus-produced material of the present invention having a rod or button shape can be made into a hard contact lens according to usual lathe-cutting and polishing.

The present invention is explained by referring to the following Examples. The siloxane oligomer having a polymerizable functional group at the molecule terminals, used in the present invention can be used not only in highly oxygen-permeable hard contact lens materials mainly composed of a fluorine-containing (meth)acrylate and/or a silicone-containing (meth)acrylate, shown in the Examples of the present invention, but also in other oxygen-permeable hard contact lens materials to provide them with improved impact resistance.

EXAMPLE 1

Into a cylindrical polyethlene tube was injected a fluid consisting of 7 parts by weight of a siloxane oligomer [an oligomer of the formula (I), $R_1=(b)$, $R_2=H$, $1=13$], 43 parts by weight of 2,2,2-trifluoroethyl methacrylate, 43 parts by weight of tris(trimethylsiloxy)silylpropyl methacrylate, 5 parts by weight of methacrylic acid, 2 parts by weight of ethylene glycol dimethacrylate and 0.25 part by weight of azobisisobutyronitrile. The tube was tightly sealed and then heated. The heating conditions were 96 hours in a constant temperature water bath of 42° C., gradual temperature elevation to 90° C. in 26 hours in an electric oven, and 10 hours at 90° C. in the oven. After the completion of the polymerization, the tube was cooled to room temperature to obtain a copolymer of rod shape. This copolymer was cut and ground to produce a disc of 0.2 mm in thickness. The disc was measured for oxygen permeability constant at 35° C. using a Seikaken type film oxygen permeability tester. The disc had an oxygen permeability coefficient of $55\times10^{-11}$ ml(STP).cm$^2$/cm$^3$.sec.mmHg. A disc of 0.5 mm in thickness was also produced in a similar manner. The disc was measured for impact resistance based on a swing angle of a striker caused by sample breakage, using a striker type impact tester manufactured by HOYA CORP (the tester for examing the impact resistance of hard contact lens, consisting mainly of a rotary bearing capable of rotating only in one direction, a striker fixed to the rotary bearing and also functioning as a pointer, a dial plate for measuring the angle of swing of the striker and a test piece holder fixed to a table movable in lengthwise, widthwise and vertical directions and also to a pedestal. See Japanese Utility Model Application No. 150022/1986). The disc had an impact resistance of 55°. Incidentally, an impact resistance of smaller angle indicates that the sample has higher impact resistance. The above rod material was cut and ground in a usual manner to produce a hard contact lens. The lathe-cutting property and polishability were good and the lens had good wettability by water and gave good feeling when worn.

COMPARATIVE EXAMPLE 1

43 parts by weight of 2,2,2-trifluoroethyl methacrylate, 43 parts by weight of tris(trimethylsiloxy)-silylpropyl methacrylate, 9 parts by weight of methacrylic acid and 5 parts by weight of ethylene glycol dimethacrylate were polymerized in the same manner as in Example 1, and the copolymer obtained was measured for properties. The oxygen permeability coefficient was $52\times11^{-11}$ ml(STP). cm$^2$/cm$^3$·sec.mmHg, which was about equal to that of Example 1. The impact resistance (swing angle) was 72° and apparently inferior to that of the copolymer of Example 1 which used a siloxane oligomer.

EXAMPLES 2-16 AND COMPARATIVE EXAMPLES 2-4

Using various monomers and various siloxane oligomers in combination, various copolymers were produced in the same manner as in Example 1. They were measured for oxygen permeability and impact resistance. The results are shown in Table 1. As is clear from Table 1, the addition of a siloxane oligomer could provide the resulting copolymer with improved impact resistance.

TABLE 1

| | Composition (parts by weight) | | | | | | | | Oxygen permeability coefficient | Impact resistance |
|---|---|---|---|---|---|---|---|---|---|---|
| | F | Si | M | MA | DAA | EDMA | TMPT | Siloxane oligomer | | ml(STP) · cm$^2$/ cm$^3$ · sec · mmHg | Angle (°) |
| Example 1 | 43 | 43 | — | 5 | — | 2 | — | Si-1 | 7 | $55 \times 10^{-11}$ | 55 |
| Comparative Example 1 | 43 | 43 | — | 9 | — | 5 | — | — | — | 52 | 72 |
| Example 2 | 50 | 25 | — | 10 | 5 | 5 | — | Si-1 | 5 | 41 | 52 |
| Comparative Example 2 | 50 | 25 | — | 10 | 7.5 | 7.5 | — | — | — | 40 | 62 |
| Example 3 | 40 | 30 | 12 | 5 | 5 | 3 | — | Si-1 | 5 | 45 | 42 |
| Example 4 | 40 | 30 | 12 | 5 | 5 | 3 | — | Si-2 | 5 | 43 | 48 |
| Example 5 | 40 | 30 | 12 | 5 | 5 | 3 | — | Si-3 | 5 | 41 | 49 |
| Example 6 | 40 | 30 | 12 | 6 | 6 | 3 | — | Si-4 | 5 | 35 | 53 |
| Example 7 | 40 | 30 | 12 | 5 | 5 | 3 | — | Si-5 | 5 | 37 | 50 |
| Example 8 | 40 | 30 | 12 | 5 | 5 | 3 | — | Si-6 | 5 | 38 | 53 |
| Comparative Example 3 | 40 | 30 | 17 | 5 | 5 | 3 | — | — | — | 33 | 57 |
| Example 9 | 45 | 45 | 7 | — | — | — | 2.9 | Si-1 | 0.1 | 45 | 65 |
| Example 10 | 45 | 45 | 5 | — | — | — | 3 | Si-1 | 2 | 47 | 50 |
| Example 11 | 42.5 | 42.5 | 5 | — | — | — | 3 | Si-1 | 7 | 48 | 48 |
| Example 12 | 42 | 42 | 3 | — | — | — | 3 | Si-1 | 10 | 48 | 45 |
| Example 13 | 38 | 37 | 7 | — | — | — | 3 | Si-1 | 15 | 51 | 40 |
| Comparative Example 4 | 45 | 45 | 7 | — | — | — | 3 | — | — | 45 | 69 |
| Example 14 | 36 | 50 | — | 8 | 2 | 2 | — | Si-1 | 2 | 60 | 57 |
| Example 15 | 36 | 52 | — | 8 | — | 2 | — | Si-1 | 2 | 64 | 58 |

TABLE 1-continued

| | Composition (parts by weight) | | | | | | | Oxygen permeability coefficient | Impact resistance |
| --- | --- | --- | --- | --- | --- | --- | --- | --- | --- |
| | F | Si | M | MA | DAA | EDMA | TMPT | Siloxane oligomer | ml(STP) · cm$^2$/ cm$^3$ · sec · mmHg | Angle (°) |
| Example 16 | 43 | 43 | — | 8 | 2 | 2 | — | Si-1  2 | 60 | 56 |

F: 2,2,2-Trifluoroethyl methacrylate
Si: Tris(trimethylsiloxy)silylpropyl methacrylate
M: Methyl methacrylate
MA: Methacrylic acid
DAA: Dimethylacrylamide
EDMA: Ethylene glycol dimethacrylate
TMPT: Trimethylolpropane trimethacrylate
Si-1: (I), $R_1$ = (b), $R_2$ = H, l = 13
Si-2: (I), $R_1$ = (b), $R_2$ = H, l = 22
Si-3: (I), $R_1$ = (b), $R_2$ = H, l = 73
Si-4: (III), $R_2$ = CH$_3$ n = 300
Si-5: (I), $R_1$ = (a), $R_2$ = H, l = 13
Si-6: (I), $R_1$ = (a), $R_2$ = H, l = 54

INDUSTRIAL APPLICABILITY

As described above, the oxygen-permeable hard contact lens material of the present invention obtained by adding a siloxane oligomer to an oxygen-permeable hard contact lens material composed mainly of a silicone-containing (meth)acrylate and/or a fluorine-containing (meth)acrylate possesses remarkably improved impact resistance. Hard contact lenses produced from the material of the present invention are less likely to break than conventional oxygen-permeable hard contact lenses which break relatively easily during handling, and accordingly have higher safety and higher economical value.

We claim:

1. An oxygen-permeable hard contact lens material with excellent impact resistance comprising a copolymer composed mainly of:
   (1) a fluorine-containing methacrylate;
   (2) a silicone-containing methacrylate; and
   (3) a siloxane oligomer having a polymerizable functional group at the molecule terminals selected from the compounds represented by the following Formulas (I) to (III):

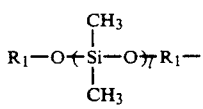

(I)

where l is an integer of 10–200, and $R_1$ is

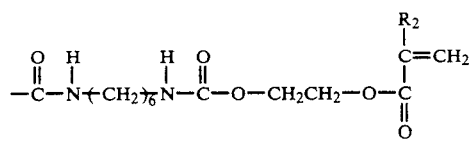

(a)

or

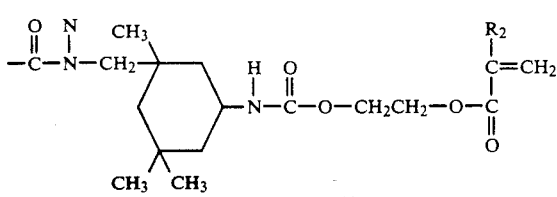

(b)

where $R_2$ is H or a methyl group

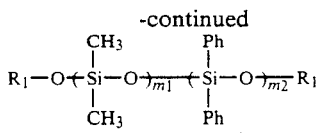

(II)

where ($m_1$ + $m_2$) is an integer of 12–140, and $m_1 \geq 0$ and $m_2 \geq 1$; Ph is a phenyl group; and $R_1$ is the same as $R_1$ of Formula (I)

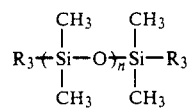

(III)

where n is an integer of 10–500, and $R_3$ is

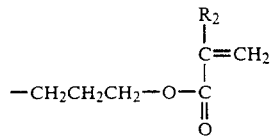

where ($R_2$ is H or a methyl group)

and mixtures thereof.

2. An oxygen-permeable hard contact lens material with excellent impact resistance according to claim 1, wherein the siloxane oligomer having a polymerizable functional group at the molecule terminals has a molecular weight of 1,000 to 6,000.

3. An oxygen-permeable hard contact lens material with excellent impact resistance according to claim 1, wherein the copolymer uses a hydrophilic monomer component and/or a crosslinkable monomer component in addition to fluorine-containing (meth)acrylates and silicone-containing (meth)acrylates 4. An oxygen-permeable hard contact lens material with excellent impact resistance according to claim 1, wherein the siloxane oligomer having a polymerizable functional group at the molecule terminals is contained in the copolymer in an amount of 0.1–15% by weight.

5. An oxygen-permeable hard contact lens material with excellent impact resistance according to claim 1, wherein the fluorine-containing (meth)acrylates are fluorine-containing $C_2$–$C_{12}$ alkyl esters of (meth)acrylic acid.

6. An oxygen-permeable hard contact lens material with excellent impact resistance according to claim 1, wherein the silicone-containing (meth)acrylates are siloxanylalkyl (meth)acrylates.

7. An oxygen-permeable hard contact lens made of the material described in claim 1.

* * * * *